US006850942B2

(12) United States Patent
Cotner et al.

(10) Patent No.: US 6,850,942 B2
(45) Date of Patent: Feb. 1, 2005

(54) SYSTEM AND METHOD FOR PROVIDING MULTIPLE VIRTUAL DATABASE CONNECTIONS IN A RELATIONAL DATABASE SYSTEM

(75) Inventors: Curt L. Cotner, Gilroy, CA (US); Paul M. Bird, Toronto (CA); Timothy J. Vincent, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/133,162

(22) Filed: Apr. 26, 2002

(65) Prior Publication Data

US 2003/0204505 A1 Oct. 30, 2003

(51) Int. Cl.$^7$ ............................................. G06F 17/30
(52) U.S. Cl. ............................................. 707/10; 707/1
(58) Field of Search ..................... 707/10, 1, 3, 5, 707/202, 104.1, 513; 709/1, 202, 203, 204, 215; 370/230, 352, 411, 255; 713/155

(56) References Cited

U.S. PATENT DOCUMENTS

| | | | |
|---|---|---|---|
| 4,845,524 A | | 7/1989 | Okamoto et al. ........... 399/184 |
| 5,764,973 A | * | 6/1998 | Lunceford et al. ............. 707/1 |
| 5,774,689 A | | 6/1998 | Curtis et al. .................. 703/21 |
| 5,873,083 A | | 2/1999 | Jones et al. ..................... 707/4 |
| 6,012,067 A | | 1/2000 | Sarkar ..................... 707/103 R |
| 6,016,497 A | | 1/2000 | Suver ..................... 707/103 R |
| 6,195,331 B1 | * | 2/2001 | Tani ........................... 370/230 |
| 6,411,956 B1 | * | 6/2002 | Ng ............................... 707/10 |
| 2001/0037345 A1 | | 11/2001 | Kiernan et al. ............... 111/67 |
| 2003/0023617 A1 | * | 1/2003 | Hunt et al. ................. 707/202 |

OTHER PUBLICATIONS

Ras, Zbigniew W. et al., "A Connectionist Model for Relational Databases," Methodologies for Intelligent Systems, 5, Proceedings of the Fifth International Symposium on Methodologies for Intelligent Systems, Oct. 25–27, 1990, Knoxville, TN, pp. 149–156.

Eldad De–Medonsa, Timos K. Sellis, "*A Connectionist Model for Relational Databases*",Methodologies for Intelligent Systems 5, Proceedings of the 5$^{th}$ International Symposium, Oct. 1990, pp. 149–156.

"*Supporting session reuse via client session replay*", IBM Research Disclosure No. 440134, Dec. 2000.

* cited by examiner

*Primary Examiner*—Charles Rones
*Assistant Examiner*—Hassan Mahmoudi
(74) *Attorney, Agent, or Firm*—Sawyer Law Group LLP

(57) ABSTRACT

A method for providing database connections in a network includes: (a) mapping a first plurality of logical connections for a transaction at the application server to a physical connection between the application server and the database server; (b) sending a request of the transaction to the database server utilizing one of the first plurality of logical connections, where the request is sent utilizing the physical connection; and (c) processing the request by a logical agent on the database server, where the logical agent is associated with the transaction, where the request is maintained in one of a second plurality of logical connections within the logical agent. In this manner, connections are logically separated from one another with minimal storage implications. Conflicts and unpredictable behavior can also be avoided.

14 Claims, 4 Drawing Sheets

SYSTEM AND METHOD FOR PROVIDING MULTIPLE VIRTUAL DATABASE CONNECTIONS IN A RELATIONAL DATABASE SYSTEM

FIELD OF THE INVENTION

The present invention relates to databases, and more particularly to the access to relational databases.

BACKGROUND OF THE INVENTION

FIG. 1 illustrates a conventional relational database network. The network comprises an application server 102 and a database server 104. As is known in the art, in object-oriented application systems, a component model is used to implement application programs at the application server 102. These application programs combine individual components into a global transaction using two-phase commit protocols. In many of these systems, it is desirable to have the individual components provide local transparency, so that the location of the component within the network is transparent to the caller. When components are constructed in this way, it is common for each individual component to create and destroy a separate database connection each time it accesses data in a relational database.

If the application is developed with a fine grain component model, the application server 102 may require a large number of physical connections to the database server 104 for a single global transaction. This results in hundreds of physical connections in order to complete the execution of the transaction.

For example, assume that an application at the application server 102 invokes a global transaction with a plurality of components. Each component is assigned a logical connection 108.1–108.3. Through the database driver 106 at the application server 102, each logical connection 108.1–108.3 is connected to the database server 104. However, for each logical connection 108.1–108.3, a separate physical connection 116.1–116.3 between the application server 102 and the database server 104 is created. Requests are then sent from the logical connections 108.1–108.3 to the database server 104 using the physical connections 116.1–116.3. Because the logical connections 108.1–108.3 are parts of the same global transaction, the requests are assigned the same global transaction identifier (GTRID1). At the database server 104, each request from the logical connections 108.1–108.3 is forwarded to a separate logical agent 112.1–112.3. The logical agents 112.1–112.3 service the requests sent through the logical connections 108.1–108.3, respectively. Once both sides of the two-phase commit/global transaction commits, the physical connections 116.1–116.3 are released.

Assume that a second global transaction is invoked by the application at the application server 102. The second global transaction also has a plurality of components. Each component is assigned a logical connection 110.1–110.3. Through the database driver 106, each logical connection 110.1–110.3 is connected to the database server 104. However, for each logical connection 110.1–110.3, a separate physical connection 118.1–118.3 between the application server 102 and the database server 104 is created. Because the logical connections 110.1–110.3 are parts of the same global transaction, they are assigned the same global transaction identifier (GTRID2). At the database server 104, each request from the logical connections 110.1–110.3 is forwarded to a separate logical agent 114.1–114.3. The logical agents 114.1–114.3 service the requests sent through the logical connections 110.1–110.3, respectively. Once both sides of the second global transaction commits, the physical connection 118.1–118.3 are released.

However, because for each logical connection 108.1–108.3 and 110.1–110.3, a separate physical connection 116.1–116.3 and 118.1–118.3 is created, because requests for each logical connection are serviced by separate logical agents at the database server 104, and because the physical connections 116.1–116.3 and 118.1–118.3 are not released until both sides of the transaction commits, the scalability and performance of the underlying relational database engine is severely limited. This problem is particularly acute for applications that require numerous database connections for a global transaction.

Accordingly, there exists a need for an improved method and system for providing database connections for a global transaction in a relational database system. The method and system should provide scalability, even for application developed with a fine grain component model. The present invention addresses such a need.

SUMMARY OF THE INVENTION

A method for providing database connections in a network includes: (a) mapping a first plurality of logical connections for a transaction at the application server to a physical connection between the application server and the database server; (b) sending a request of the transaction to the database server utilizing one of the first plurality of logical connections, where the request is sent utilizing the physical connection; and (c) processing the request by a logical agent on the database server, where the logical agent is associated with the transaction, where the request is maintained in one of a second plurality of logical connections within the logical agent. In this manner, connections are logically separated from one another with minimal storage implications. Conflicts and unpredictable behavior can also be avoided.

DETAILED DESCRIPTION

The present invention provides an improved method and system for providing database connections for a global transaction in a relational database system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention comprises an application server with a database driver and a database server. The database driver maps logical connections that are part of the same global transaction onto the same physical connection between the application server and the database server. Requests sent from the logical connections are serviced by a logical agent at the database server that is associated with the global transaction. The logical agent maintains logical connections within itself, each of which corresponds to a logical connection at the application server. Requests from each of the logical connections at the application server are logically separated within the corresponding logical connections within the logical agent.

To more particularly describe the features of the present invention, please refer to FIGS. 2 through 4 in conjunction with the discussion below.

Figure 1:
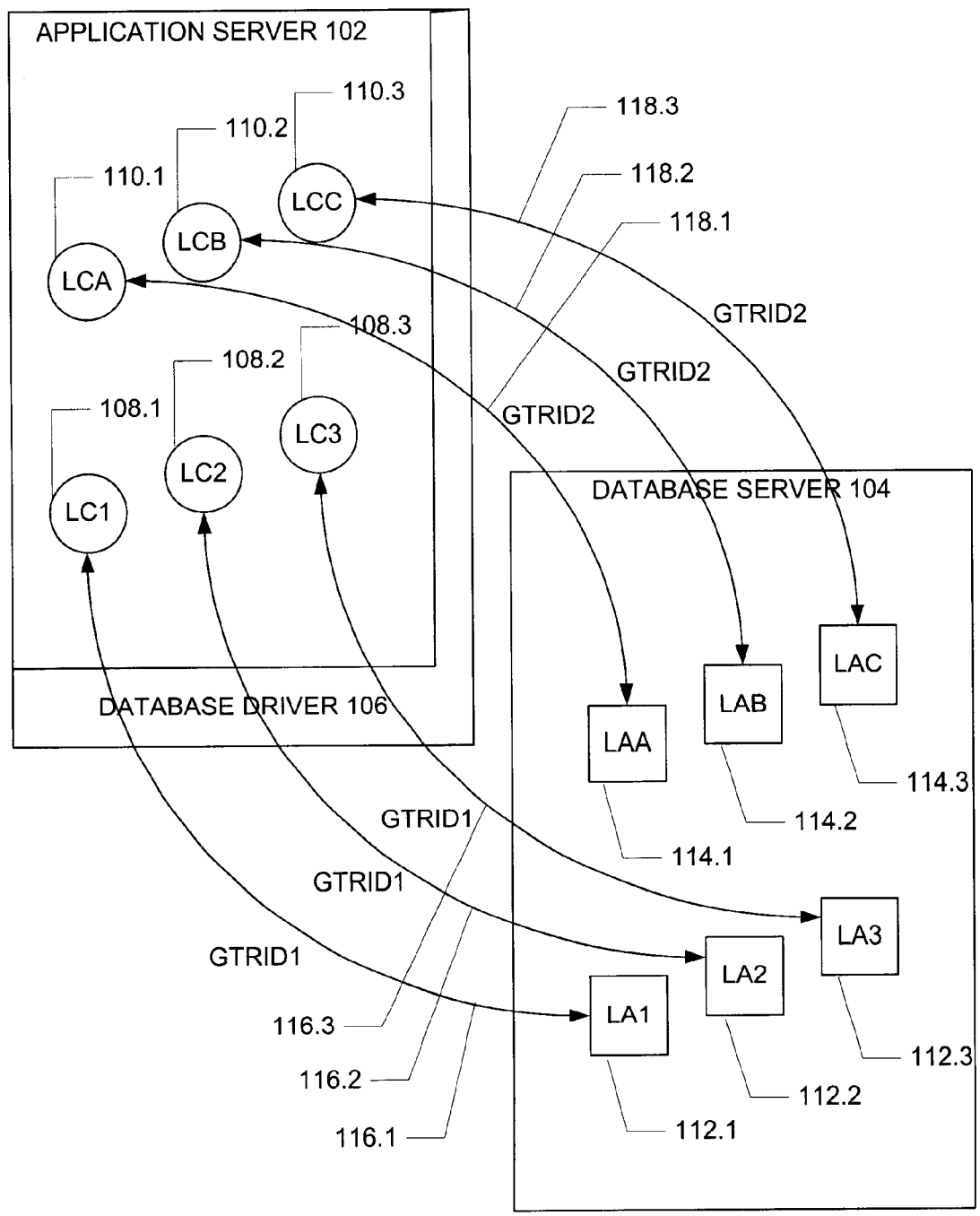
FIG. 1 illustrates a conventional relational database network.
Figure 2:
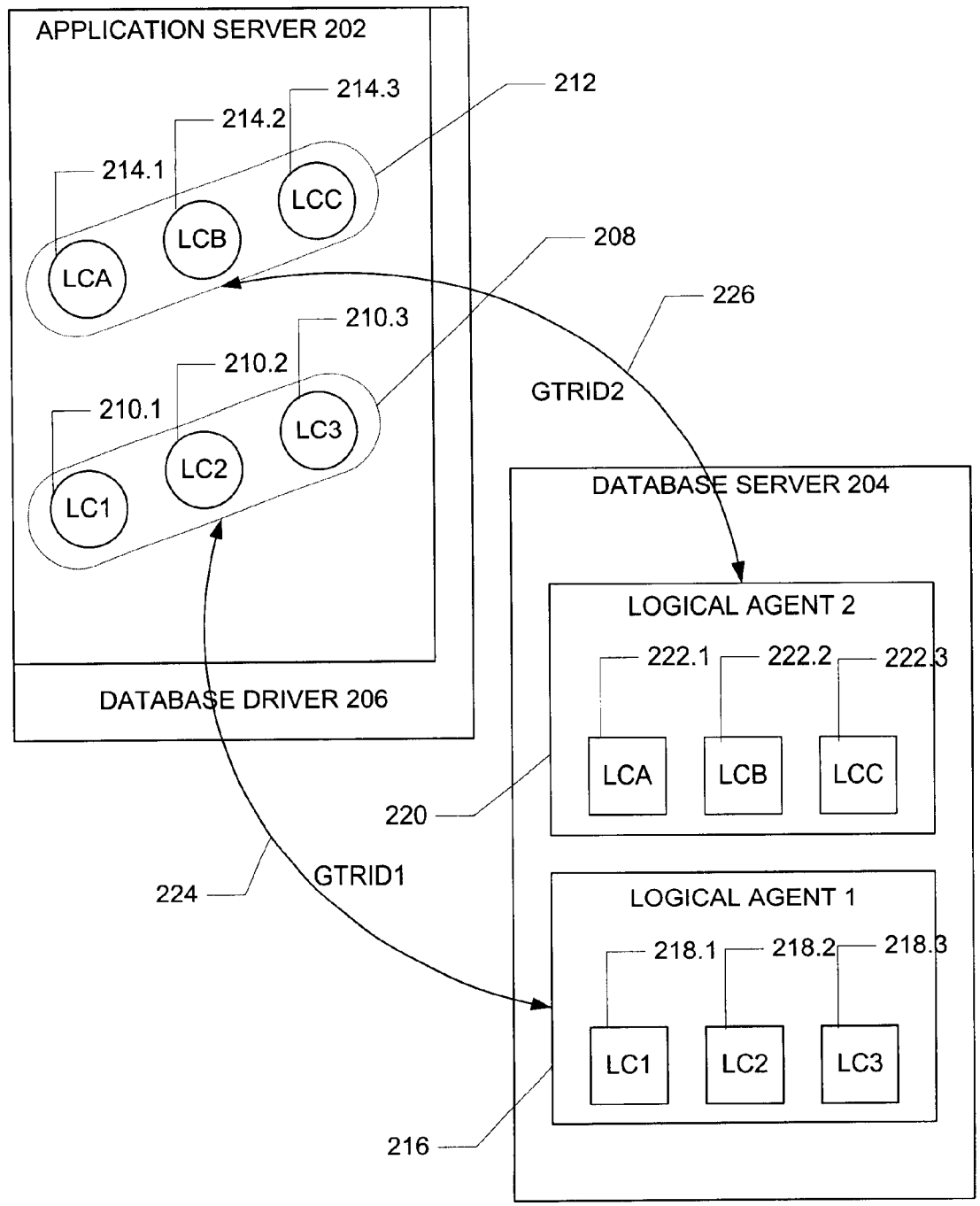
FIG. 2 illustrates a preferred embodiment of a system for providing database connections in accordance with the present invention.

FIG. 2 illustrates a preferred embodiment of a system for providing database connections in accordance with the present invention. The system comprises an application server 202 with a database driver 206 and a database server 204. In the preferred embodiment, the logical connections 210.1–210.3 of the same global transaction 208 are logically grouped together by the database driver 206. For the global transaction 208, the database driver 206 creates one physical connection 224 with the database server 204. The database driver 206 maps the logical connections 210.1–210.3 onto the physical connection 224. Requests from the logical connections 210.1–210.3 are sent using the physical connection 224 to a logical agent 216 on the database server 204 that is associated with the global transaction 208. The logical agent 216 maintains its own logical connections 218.1–218.3 that correspond to the logical connections 210.1–210.3, respectively, on the application server 202. The logical agent 216 services the requests from the logical connections 210.1–210.3 and maintains them according to their corresponding logical connections 218.1–218.3.

For example, assume that a request on the logical connection 210.1 sets special registers at the database server 204 and that a request on the logical connection 210.2 sets the same special registers. The logical agent 216 can maintain two instances of the special registers, one within the logical connection 218.1 corresponding to the logical connection 210.1, and another within the logical connection 218.2 corresponding to the logical connection 210.2. The instance of the special registers within the logical connection 218.1 has no impact on the instance of the special registers within the logical connection 218.2. In this manner, the logical agent 216 can separate characteristics of one connection logically from another with minimal storage implications. Conflicts and unpredictable behavior can also be avoided.

The same is true for a second set of logical connections 214.1–214.3, which is part of a second global transaction 212. The logical connections 214.1–214.3 are logically grouped together by the database driver 206. For the global transaction 212, the database driver 206 creates one physical connection 226 with the database server 204. The database driver 206 maps the logical connections 214.1–214.3 onto the physical connection 226. Requests from the logical connections 214.1–214.3 are sent using the physical connection 226 to a logical agent 220 on the database server 204 that is associated with the global transaction 212. The logical agent 220 maintains its own logical connections 222.1–222.3 that correspond to the logical connections 214.1–214.3, respectively, on the application server 202. The logical agent 220 services the requests from the logical connections 214.1–214.3 and maintains them according to their corresponding logical connections 222.1–222.3.

Because the logical connections of the same global transaction are mapped onto the same physical connection, and because a logical agent associated with the global transaction maintains the structure of the logical connections 210.1–210.3 with corresponding logical connections 218.1–218.3, the system in accordance with the present invention has better scalability and performance than conventional systems.

Figure 3:
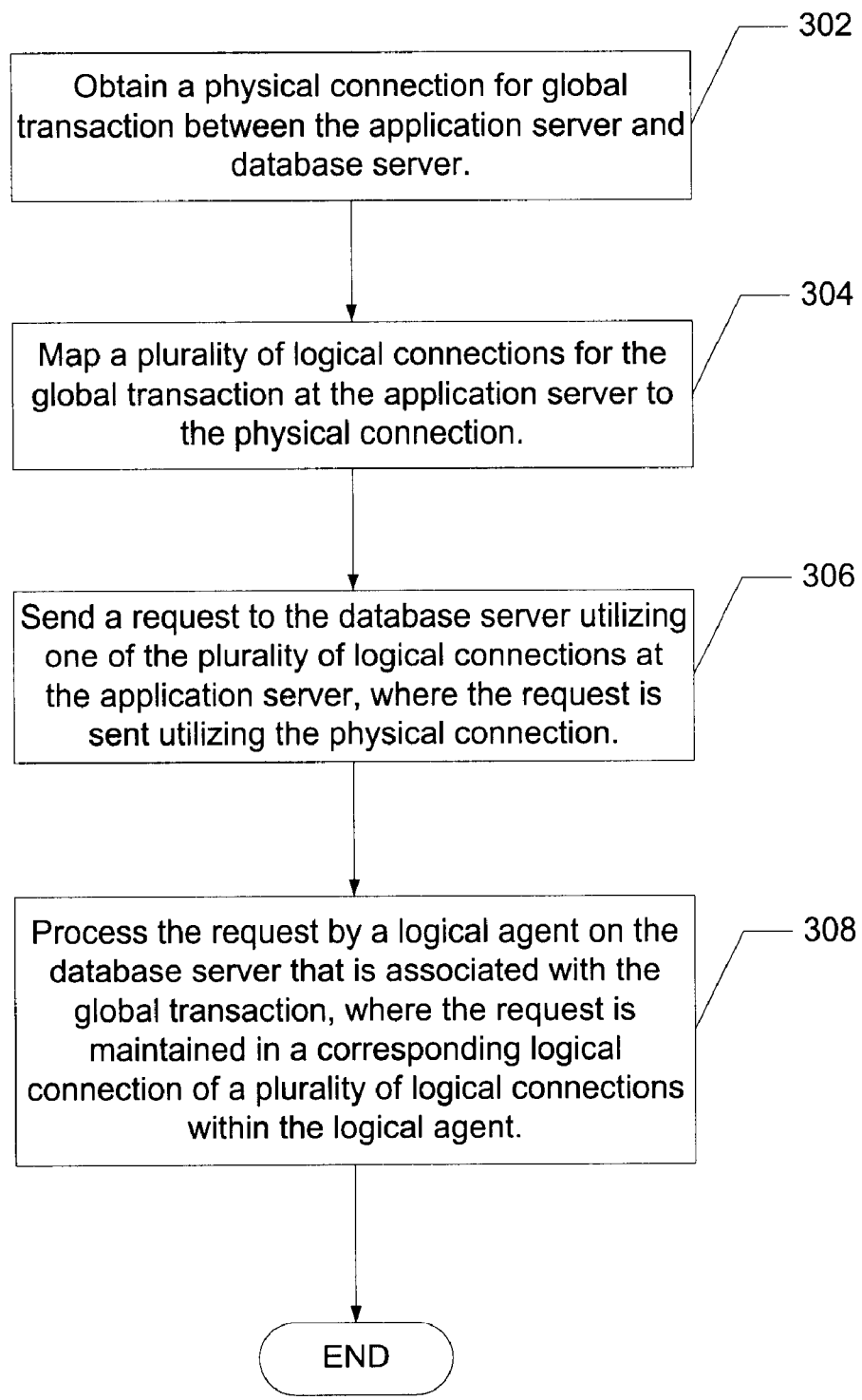
FIG. 3 is a flowchart illustrating a preferred embodiment of a method for providing database connections for a global transaction in a relational database system.

FIG. 3 is a flowchart illustrating a preferred embodiment of a method for providing database connections for a global transaction in a relational database system. Referring to both FIGS. 2 and 3, first, a physical connection 224 for the global transaction 208 between the application server 202 and the database server 204 is obtained, via step 302. Next, a plurality of logical connections 210.1–210.3 at the application server 202 is mapped to the same physical connection 224, via step 304. In the preferred embodiment, the database driver 206 performs the mapping steps. When a request is sent to the database server 204 utilizing one of the plurality of logical connections 210.1–210.3 at the application server 202, it is sent utilizing the physical connection 224, via step 306. The request is then processed by a logical agent 216 at the database server 204 that is associated with the global transaction 208, via step 308. The request is maintained in a corresponding logical connection of a plurality of logical connections 218.1–218.3 within the logical agent 216.

The same is true for the global transaction 212. First, a physical connection 226 for the global transaction 212 between the application server 202 and the database server 204 is obtained, via step 302. Next, a plurality of logical connections 214.1–214.3 at the application server 202 is mapped to the same physical connection 226, via step 304. When a request is sent to the database server 204 utilizing one of the logical connections 214.1–214.3 at the application server 202, it is sent utilizing the physical connection 226, via step 306. The request is then processed by a logical agent 220 on the database server 204 that is associated with the global transaction 212, via step 308. The request from one of the plurality of logical connections 214.1–214.3 at the application server 202 is maintained in a corresponding logical connection of a plurality of logical connections 222.1–222.3 within the logical agent 220.

Figure 4:
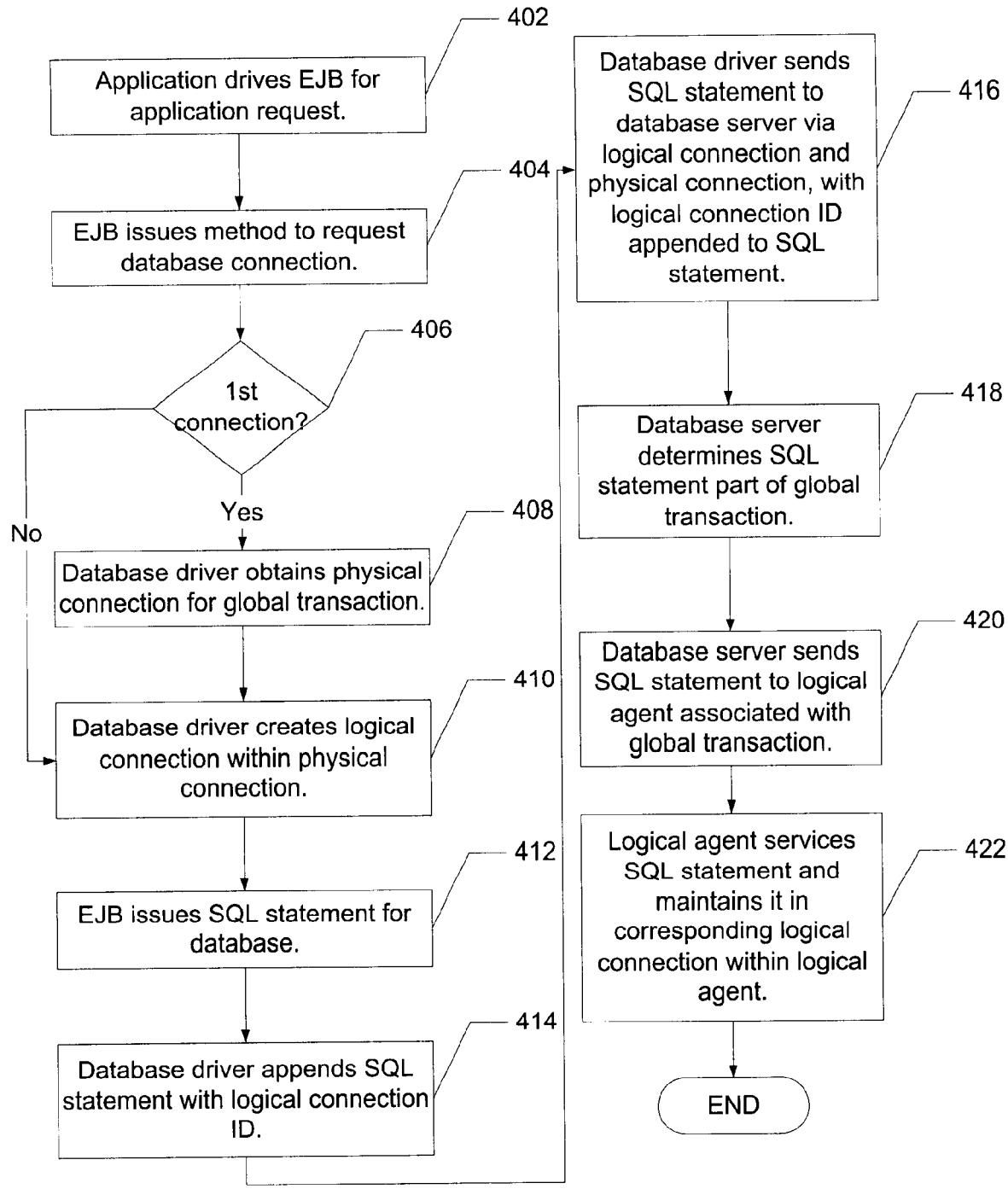
FIG. 4 is a flowchart illustrating in more detail the preferred embodiment of the method for providing database connections for a global transaction in a relational database system.

FIG. 4 is a flowchart illustrating in more detail the preferred embodiment of the method for providing database connections for a global transaction in a relational database system. In the preferred embodiment, the database driver 206 comprises a plurality of Enterprise JavaBeans™ (EJB). Written in the Java™ programming language, an EJB is an application server-side component that encapsulates the business logic of an application. The business logic is the code that fulfills the purpose of the application.

Thus, when an application at the application server 202 initiates a request, the application drives the appropriate EJB, via step 402. Assume that the request requires a global transaction 208. The EJB issues the appropriate method to request a connection to the database server 204, via step 404. If this is the first connection to the database server 204 for the global transaction 208, via step 406, then the database driver 206 obtains a physical connection 224 for the global transaction 208, via step 408. The database driver 206 then creates a logical connection 210.1 within the physical connection 224, via step 410. When the EJB issues a Structured Query Language (SQL) statement for the database server 204 for the application's request, via step 412, the database driver 206 tags the SQL statement with a logical connection identifier for the logical connection 210.1, via step 414. The database driver 206 then sends the SQL statement to the database server 204 via the logical connection 210.1 and the physical connection 224, with the logical connection identifier appended to the SQL statement, via step 416. In the preferred embodiment, this logical connection identifier is an extension of the conventional naming scheme for SQL objects and is appended to all SQL statements, including those not part of a global transaction. It is the database server 204 that decides whether the appended logical connection identifier is used in accordance with the present invention.

Upon receipt of the SQL statement, the database server 204 determines that the SQL statement is part of a global transaction 208, via step 418. In the preferred embodiment, the database server 204 is able to identify certain SQL concepts that are known to require global transactions. Such SQL concepts include but are not limited to SQL statement section numbers, SQL cursor names, identity columns and sequences, savepoints, and temporary tables. The database server 204 then sends the SQL statement to a logical agent 216 associated with the global transaction 208, via step 420. The logical agent 216 then services the SQL statement, via step 422, and maintains it in a corresponding logical connection 218.1 within the logical agent 216.

When the application drives the EJB again with another request for the global transaction 208, via step 402, the EJB issues the appropriate method to request another database connection, via step 404. Since this is not the first connection for the global transaction 208, via step 406, the database driver 206 does not obtain another physical connection. Instead, the database driver 206 creates another logical connection 210.2 within the same physical connection 224, via step 410. The EJB then issues a second SQL statement for the database, via step 412. The database driver tags the second SQL statement with a second logical connection identifier for the second logical connection 210.2, via step 414. The database driver 206 then sends the second SQL statement to the database server 204 via the logical connection 210.2 and the physical connection 224, with the second logical connection identifier appended to the second SQL statement, via step 416.

Upon receipt of the second SQL statement, the database server 204 determines that the second SQL statement is part of the global transaction 208, via step 418. The database server 204 then sends the second SQL statement to the logical agent 216 associated with the global transaction 208, via step 420. The logical agent 216 then services the SQL statement, via step 422, and maintains it within a corresponding logical connection 218.2 within the logical agent 216.

For example, assume that the database driver 206 is a Java Database Connectivity (JDBC) driver that comprises a plurality of EJB's. Assume that a Java application drives an EJB that begins a global transaction 208, via step 402, by issuing a javax.transaction.UserTransaction.begin( ) method, or by declaring the EJB as a bean that requires a global transaction 208. Next, the EJB issues the getConnection( ) method to request a database connection, via step 404. Since this is the first database connection for the global transaction 208, via step 406, the JDBC driver 206 obtains a physical connection 224 to the database server 204, via step 408. The JDBC driver 206 also creates a logical connection 210.1 within the physical connection 224, via step 410. All subsequent SQL operations performed using the logical connection 210.1 will be tagged as operations designated for the logical connection 210.1.

Next, the EJB uses the JDBC driver 206 to create a JDBC statement object and invokes the executeQuery( ) method to issue a SQL statement for the database, via step 412. The JDBC driver 206 automatically tags the SQL statement with the logical connection identifier, "LC1", via step 414. For example, the SQL statement:

SET CURRENT PACKAGESET='MY_COLLECTON' would result in the following:

LC1. "CURRENT PACKAGESET"='MY_COLLECTION'.

The JDBC driver 206 then sends the SQL statement to the database server 204 utilizing the physical connection 224, via step 416, with "LC1" appended to the SQL statement. The database server 204 determines that the SQL statement is part of the global transaction 208, via step 418. The database server 204 sends the SQL statement to the logical agent 216 associated with the global transaction 208, via step 420. The logical agent 216 services the SQL statement, via step 422, and maintains it in the corresponding logical connection 218.1 within the logical agent 216.

The EJB may be used to issue the getConnection( ) method again to request another database connection to the same database, via step 404. Since this is the second request within the global transaction 208, the JDBC driver 206 would request a second logical connection 210.2 on the physical connection 224 that was obtained earlier, via steps 406 and 410. The EJB can then use the JDBC driver 206 to create a JDBC statement object and issue a second SQL statement on the logical connection 210.2, via step 412. The JDBC driver 206 automatically tags the second SQL statement with the logical connection identifier "LC2". Thus, the statement:

SET CURRENT PACKAGESET='COLL5' would result in the following:

LC2. "CURRENT PACKAGESET"='COLL5'.

The logical connection 210.2 can be destroyed without destroying the physical connection 224.

The database server 204 uses the logical connection identifiers, "LC1" and "LC2", appended to the SQL statements, to maintain them in separate name spaces, represented by the corresponding logical connections 218.1–218.2. Thus, when the JDBC driver 206 is used to issue the following:

SELECT CURRENT PACKAGESET FROM T1, the JDBC driver 206 would return the value 'MY_COLLECTION' when the query was issued using the logical connection 210.1 associated with the identifier "LC1". If the same query was issued using the logical connection 210.2, the JDBC driver 206 would return the value 'COLL5'.

Although the present invention is described above with an extension of the naming convention to logically separate the logical connections at the database server, one of ordinary skill in the art will understand that other ways of achieving this logical separation may be used without departing from the spirit and scope of the present invention.

An improved method and system for providing database connections has been disclosed. The method and system comprises an application server with a database driver and a database server. The database driver maps logical connections that are part of the same global transaction onto the same physical connection between the application server and the database server. Requests sent from the logical connections are serviced by a logical agent at the database server that is associated with the global transaction. The logical agent maintains logical connections within itself, each of which corresponds to a logical connection at the application server. Requests from each of the logical connections at the application server are logically separated within the corresponding logical connections within the logical agent. In this manner, connections are logically separated from one another with minimal storage implications. Conflicts and unpredictable behavior can also be avoided.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A database server, comprising:
   a logical agent associated with a transaction, wherein the logical agent receives a plurality of requests for the transaction from a first plurality of logical connections at an application server, wherein the first plurality of logical connections is mapped to a physical connection with the application server, wherein the plurality of requests are sent to the logical agent utilizing the flip physical connection for the transaction; and
   a second plurality of logical connections within the logical agent, wherein each of the second plurality of logical connections correspond to one of the first plurality of logical connections, wherein queries for the plurality of requests from the first plurality of logical connections are serviced by the logical agent and maintained within the corresponding second plurality of logical connections.

2. A method for providing database connections in a network, the network including an application server and a database server, comprising the steps of:
   (a) mapping a first plurality of logical connections for a transaction at the application server to a physical connection between the application server and the database server, wherein each of the first plurality of logical connections corresponds to one of a second plurality of logical connections at the database server;
   (b) sending a request of the transaction to the database server utilizing a first logical connection of the first plurality of logical connections, wherein the request is sent utilizing the physical connection; and
   (c) processing the request by a logical agent on the database server, wherein the logical agent is associated with the transaction, wherein the request is maintained in a second logical connection of the second plurality of logical connections within the logical agent, wherein the first logical connection corresponds to the second logical connection.

3. The method of claim 2, wherein the mapping step (a) comprises:
   (a1) issuing the request;
   (a2) requesting a database connection for the request;
   (a3) obtaining the physical connection, if the database connection request is a first database connection request for the transaction; and
   (a4) creating the first logical connection of the first plurality of logical connections within the physical connection.

4. The method of claim 3, wherein the sending step (b) comprises:
   (b1) issuing a Structured Query Language (SQL) statement for the request;
   (b2) appending a logical connection identifier to the SQL statement, wherein the logical connection identifier identifies the first logical connection; and
   (b3) sending the SQL statement appended with the logical connection identifier to the database server utilizing the first logical connection, wherein the SQL statement is sent utilizing the physical connection.

5. The method of claim 4, wherein the processing step (c) comprises:
   (c1) determining that the SQL statement is part of the transaction;
   (c2) sending the SQL statement to the logical agent; and
   (c3) servicing the SQL statement by the logical agent, wherein the SQL statement is maintained in the second logical connection of the second plurality of logical connections, wherein the second logical connection corresponds to the first logical connection.

6. A computer readable medium with program instruction for providing database connections in a network, the network including an application server and a database server, comprising the instructions for:
   (a) mapping a first plurality of logical connections for a transaction at the application server to a physical connection between the application server and the database server, wherein each of the first plurality of logical connections corresponds to one of a second plurality of logical connections at the database server;
   (b) sending a request of the transaction to the database server utilizing a first logical connection of the first plurality of logical connections, wherein the request is sent utilizing the physical connection; and
   (c) processing the request by a logical agent on the database server, wherein the logical agent is associated with the transaction, wherein the request is maintained in a second logical connection of the second plurality of logical connections within the logical agent, wherein the first logical connection corresponds to the second logical connection.

7. The medium of claim 6, wherein the mapping instruction (a) comprises:
   (a1) issuing the request;
   (a2) requesting a database connection for the request;
   (a3) obtaining the physical connection, if the database connection request is a first database connection request for the transaction; and
   (a4) creating the first logical connection of the first plurality of logical connections within the physical connection.

8. The medium of claim 7 wherein the sending instruction (b) comprises:
   (b1) issuing a Structured Query Language (SQL) statement for the request;
   (b2) appending a logical connection identifier to the SQL statement, wherein the logical connection identifier identifies the first logical connection; and
   (b3) sending the SQL statement appended with the logical connection identifier to the database server utilizing the first logical connection, wherein the SQL statement is sent utilizing the physical connection.

9. The medium of claim 8, wherein the processing instruction (c) comprises:
   (c1) determining that the SQL statement is part of the transaction;
   (c2) sending the SQL statement to the logical agent; and (c3) servicing the SQL statement by the logical agent, wherein the SQL statement is maintained in the second logical connection of the second plurality of logical connections, wherein the second logical connection corresponds to the first logical connection.

10. A method for providing database connections in a network, the network including an application server and a database server, comprising the steps of:

(a) issuing a request for a transaction;

(b) mapping a first logical connection of a first plurality of logical connections for the transaction at the application server to a physical connection between the application server and the database server, wherein the first logical connection corresponds to a second logical connection of a second plurality of logical connections at the database server;

(c) appending a logical connection identifier to the request, wherein the logical connection identifier identifies the first logical connection;

(d) sending the request appended with the logical connection identifier to the database server utilizing the first logical connection, wherein the SQL statement is sent utilizing the physical connection;

(e) sending the request to a logical agent on the database server, wherein the logical agent is associated with the transaction; and (f) servicing the request by the logical agent, wherein the SQL statement is maintained in the second logical connection of the second plurality of logical connections within the logical agent, wherein the second logical connection corresponds to the first logical connection.

11. A method for providing database connections in a network, the network including an application server and a database server, comprising the steps of:

(a) requesting a database connection for a transaction request;

(b) obtaining a physical connection for the transaction, if the database connection request is a first database connection request for the transaction;

(c) creating a first logical connection of a first plurality of logical connections within the physical connection, wherein the first logical connection corresponds to a second logical connection of a second plurality of logical connections at the database server;

(d) issuing a query for the request having an appended logical connection identifier identifying the first logical connection;

(e) sending the query over the first logical connection to a logical agent on the database server, wherein the logical agent is associated with the transaction; and (f) servicing the query by the logical agent, wherein the query is maintained in the second logical connection of the second plurality of logical connections within the logical agent, wherein the second logical connection corresponds to the first logical connection.

12. A computer readable medium with program instructions for providing database connections in a network, the network including an application server and a database server, comprising the instructions for:

(a) issuing a request for a transaction;

(b) mapping a first logical connection of a first plurality of logical connections for the transaction at the application server to a physical connection between the application server and the database server, wherein the first logical connection corresponds to a second logical connection of a second plurality of logical connections at the database server;

(c) appending a logical connection identifier to the request, wherein the logical connection identifier identifies the first logical connection;

(d) sending the request appended with the logical connection identifier to the database server utilizing the first logical connection, wherein the SQL statement is sent utilizing the physical connection;

(e) sending the request to a logical agent on the database server, wherein the logical agent is associated with the transaction; and (f) servicing the request by the logical agent, wherein the SQL statement is maintained in the second logical connection of the second plurality of logical connections within the logical agent, wherein the second logical connection corresponds to the first logical connection.

13. A computer readable medium with program instructions for providing database connections in a network, the network including an application server and a database server, comprising the instructions for:

(a) requesting a database connection for a transaction request;

(b) obtaining a physical connection for the transaction, if the database connection request is a first database connection request for the transaction;

(c) creating a first logical connection of a first plurality of logical connections within the physical connection, wherein the first logical connection corresponds to a second logical connection of a second plurality of logical connections at the database server;

(d) issuing a query for the request having an appended logical connection identifier identifying the first logical connection;

(e) sending the query over the first logical connection to a logical agent on the database server, wherein the logical agent is associated with the transaction; and (f) servicing the query by the logical agent, wherein the query is maintained in the second logical connection of the second plurality of logical connections within the logical agent, wherein the second logical connection corresponds to the first logical connection.

14. A system, comprising:

an application server comprising a database driver and a first plurality of logical connections for a transaction, wherein each of the first plurality of logical connections corresponds to one of a second plurality of logical connections at a database server, wherein the database driver maps the first plurality of logical connections to a physical connection between the application server and the database server, wherein the database driver sends a request of the transaction to the database server utilizing a first logical connection of the first plurality of logical connections, wherein the request is sent utilizing the physical connection; and the database server, wherein the database server comprises a logical agent associated with the global transaction, wherein the logical agent comprises the second plurality of logical connections, wherein the request is maintained in a second logical connection of the second plurality of logical connections, wherein the first logical connection corresponds to the second logical connection.

* * * * *

UNITED STATES PATENT AND TRADEMARK OFFICE
CERTIFICATE OF CORRECTION

PATENT NO. : 6,850,942 B2
DATED : February 1, 2005
INVENTOR(S) : Curt L. Cotner et al.

It is certified that error appears in the above-identified patent and that said Letters Patent is hereby corrected as shown below:

Column 7,
Line 22, delete "flip".

Signed and Sealed this

Twenty-first Day of June, 2005

JON W. DUDAS
*Director of the United States Patent and Trademark Office*